(12) United States Patent
Morrison

(10) Patent No.: US 10,567,593 B1
(45) Date of Patent: Feb. 18, 2020

(54) INTEGRATED VOIP AND ROIP COMMUNICATION NETWORK

(71) Applicant: Scott Morrison, Niceville, FL (US)

(72) Inventor: Scott Morrison, Niceville, FL (US)

( * ) Notice: Subject to any disclaimer, the term of this patent is extended or adjusted under 35 U.S.C. 154(b) by 0 days.

(21) Appl. No.: 15/993,212

(22) Filed: May 30, 2018

(51) Int. Cl.
  *H04W 80/04* (2009.01)
  *H04M 7/00* (2006.01)
  *H04L 12/66* (2006.01)
  *H04W 88/16* (2009.01)
  *H04M 3/533* (2006.01)

(52) U.S. Cl.
  CPC ......... *H04M 7/0075* (2013.01); *H04W 80/04* (2013.01); *H04L 12/66* (2013.01); *H04M 3/533* (2013.01); *H04W 88/16* (2013.01)

(58) Field of Classification Search
  CPC ...... H04L 69/08; H04W 40/00; H04W 76/32; H04W 76/45; H04W 84/042; H04W 84/08; H04W 80/04; H04W 88/16; H04M 7/0075
  USPC ........ 370/352, 401, 466, 218; 455/516, 518, 455/519
  See application file for complete search history.

(56) References Cited

U.S. PATENT DOCUMENTS

| | | | |
|---|---|---|---|
| 7,924,780 B2 | 4/2011 | Waisman-Diamond | |
| 8,112,078 B2 | 2/2012 | Calabrese | |
| 8,126,430 B2 | 2/2012 | Varsavsky Waisman-Diamond | |
| 8,306,502 B2 | 11/2012 | Varsavsky Waisman-Diamond | |
| 8,326,338 B1 | 12/2012 | Vasilevsky | |
| 8,446,883 B2 | 5/2013 | Curtin et al. | |
| 8,515,479 B1 | 8/2013 | Vasilevsky | |
| 8,611,509 B1* | 12/2013 | Basart | H04M 3/4938 370/352 |
| 8,842,663 B2 | 9/2014 | Brothers et al. | |
| 8,904,522 B1 | 12/2014 | Kambhampati et al. | |
| 9,088,955 B2 | 7/2015 | Varsavsky Waisman-Diamond | |
| 9,125,170 B2 | 9/2015 | Varsavsky Waisman-Diamond | |
| 9,826,102 B2 | 11/2017 | Varsavsky Waisman-Diamond | |
| 9,853,834 B2 | 12/2017 | Meier et al. | |
| 2006/0256713 A1* | 11/2006 | Rozinsky | H04W 84/08 370/218 |
| 2010/0159975 A1* | 6/2010 | Shaffer | H04W 76/32 455/516 |
| 2010/0260173 A1 | 10/2010 | Johnson | |
| 2011/0064022 A1 | 3/2011 | Curtin et al. | |
| 2012/0231787 A1 | 9/2012 | Conner et al. | |
| 2014/0050123 A1 | 2/2014 | Chandler et al. | |
| 2014/0099905 A1 | 4/2014 | Jimenez | |
| 2015/0085856 A1 | 3/2015 | Bouvet | |
| 2015/0304370 A1 | 10/2015 | Maytal | |
| 2016/0021260 A1 | 1/2016 | Varsaysky Waisman-Diamond | |

* cited by examiner

*Primary Examiner* — Harun Chowdhury
(74) *Attorney, Agent, or Firm* — Peter Loffler

(57) ABSTRACT

A communication network that combines radios using RF communication and devices that communicate over the public switched telephone network and/or a cellular network so that the various devices can communicate across a single system with the radios being callable from any other device connected to the system. The system combines Radio over Internet Protocol communication with Voice over Internet Protocol communication into a single integrated architecture that allows seamless communication by all communication devices connected to the system.

11 Claims, 5 Drawing Sheets

INTEGRATED VOIP AND ROIP COMMUNICATION NETWORK

BACKGROUND OF THE INVENTION

1. Field of the Invention

The present invention relates to a communication network that seamlessly integrates a RoIP (Radio over Internet Protocol) network communication capability and a VoIP (Voice over Internet Protocol) network communication capability into a single integrated communication network wherein devices on the RoIP and VoIP can communicate with one another each from a single end point.

2. Background of the Prior Art

Radios are manufactured transmission devices that communicate over various radio frequencies (RF) in multiple spectrums (i.e. UHF, VHF, SATCOM, FRS, FM, etc.) to provide short- and/or long-reach wireless point-to-point mobile communication capability. Radios may be attached to an Internet Protocol (IP) based network, thereby creating an RoIP network, where the IP network is used as a transport mechanism for the signals generated by the radios to increase the radios' RF range and end-to-end communication reach.

In a crisis management environment, voice communication (i.e., telephones, radios, etc.,) and data communication (i.e., chat, computers, video, etc.,) are mainly anchored by established networks in fixed infrastructures such as at operations centers, emergency rooms, flight control centers, police stations, fire stations, etc., and tend to utilize the PSTN (Public Switched Telephone Network) network as their communication pathway. Mobile devices such as cellular-based technology (i.e., cell phones) are used by roaming users to allow such users to communicate with these fixed infrastructures where the cellular traffic is routed through the PSTN. Cellular-based technology is different from the radios communicating over RF, in frequency, capability, use case, and functionality and the cellular-based technology is not compatible with the radio RF communication technology and therefore cellular phones and radios communicating over RF cannot communicate with one another.

A crisis management center, such as a hurricane operations center or a battlefield command center, have environments where the centers have two separate and distinct communication capabilities that don't communicate with each other, namely radios operating over RF and voice communication devices operating through the PSTN. This is because VoIP end user instruments (IP Phones) and circuit-based instruments POTS (Plain Old Telephones) are not built to combine both radio and voice communication (IP Phones, POTS, cell phones) within the same instrument, let alone provide additional capability and functionality to better serve the customer in an emergency (crisis). This is problematic as users communicating via radios over RF cannot communicate with users communicating over the PSTN. At the crisis management center, the communication operators are required to communicate with the two types of users over two separate networks wherein the communication's hardware for each network may be located in a different room or even on a different floor. These operators must act as a go between for radio over RF users and other users using PSTN communication. This gap leads to errors and missed communication.

What is needed is a way to integrate a RoIP network with a VoIP network to create a single seamless communication network where users can communicate with one another irrespective of the communication platform being used. Such a combined network needs to have a common communication protocol in order to allow any user on one network to be able to communicate with other users on the other network irrespective of communication protocol being utilized by any of the users. Ideally, such a network has added functionality to make the network highly functional and robust.

SUMMARY OF THE INVENTION

The integrated VoIP and RoIP communication network of the present invention addresses the aforementioned needs by providing a single communication network utilizing a common communication protocol wherein users utilizing radio RF communication protocols and users utilizing PSTN communication protocols can seamlessly communicate with one another over a common network. The integrated VoIP and RoIP communication network integrates communication using VoIP and RoIP into a single "combined" network wherein cross platform communication is invisible to the end user. The integrated VoIP and RoIP communication network is robust in that additional communication features are available on the network such as chat, voice mail, conferencing, including video conferencing, etc. The integrated VoIP and RoIP communication network of the present invention is a build out of an application and an end user IP-based device that couples both radio and IP technologies to improve, enhance and extend global communication.

The integrated VoIP and RoIP communication network of the present invention comprises an Internet Protocol based network backbone under the control of a server. A first two-way communication device that communicates over a radio frequency is communicatively connected to the network backbone. The first communication device has a radio E&M port. A second two-way communication device that communicates over a telephone network is communicatively coupled to the network back bone such that the first communication device and the second communication device communicate with one another. A RoIP (Radio over Internet Protocol) gateway has an InterWorking Function with an InterWorking Function E&M port. A cable has a first end that is connected to the radio E&M port and a second end that is connected to the InterWorking Function E&M port of the RoIP gateway to thereby communicatively connecting the first communication device to the network backbone. The InterWorking Function tags the first communication device with a unique set of digits which correspond to a unique routable Internet Protocol address. The communication of the first communication device over the network backbone is under the control of the server. The second communication device is a telephone that operates over a Public Switch Telephone Network or a cellular telephone network. The network backbone has a Chat Presence subsystem usable by the first communication device and the second communication device, the Chat Presence subsystem under the control of the server. The network backbone has a Voice Mail subsystem usable by the first communication device and the second communication device under the control of the server. The network backbone has a voice and/or video Conference Scheduling subsystem usable by the first communication device and the second communication device under the control of the server. The network backbone has a Video Communication subsystem usable by the first communication device and the second communication device under the control of the server. The network backbone has a Voice Recording subsystem usable by the first communication device and the second communication device under the control of the server. The network backbone has a voice communication subsystem usable by the second communication device under the control of the server Basically, communication in general using the present invention, regardless of using IP, cellular, PSTN and/or RF (radio) transport mediums, is all combined by building the present architecture where the CMC (Crisis Management Communication) server is the hub that connects to the various other controlling entities (call control for IP, PSTN through a voice gateway, radio frequencies through attached radios, and lastly the cellular network, again through either an IP and/or PSTN network).

BRIEF DESCRIPTION OF THE DRAWINGS

Similar reference numerals refer to similar parts throughout the several views of the drawings.

DESCRIPTION OF THE PREFERRED EMBODIMENT

Figure 1:
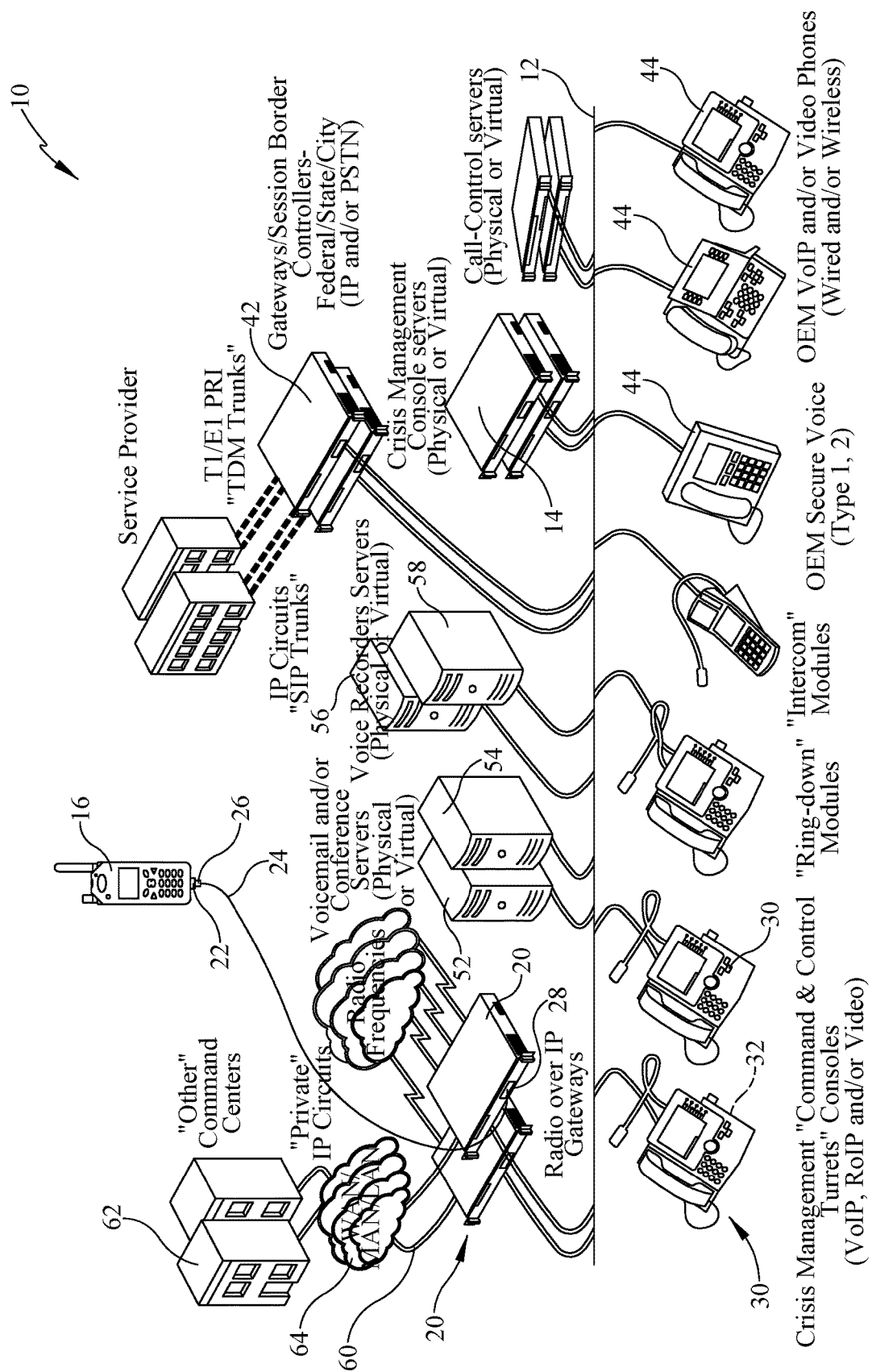
FIG. 1 is an overall schematic of the integrated VoIP and RoIP communication network of the present invention.
Figure 2:
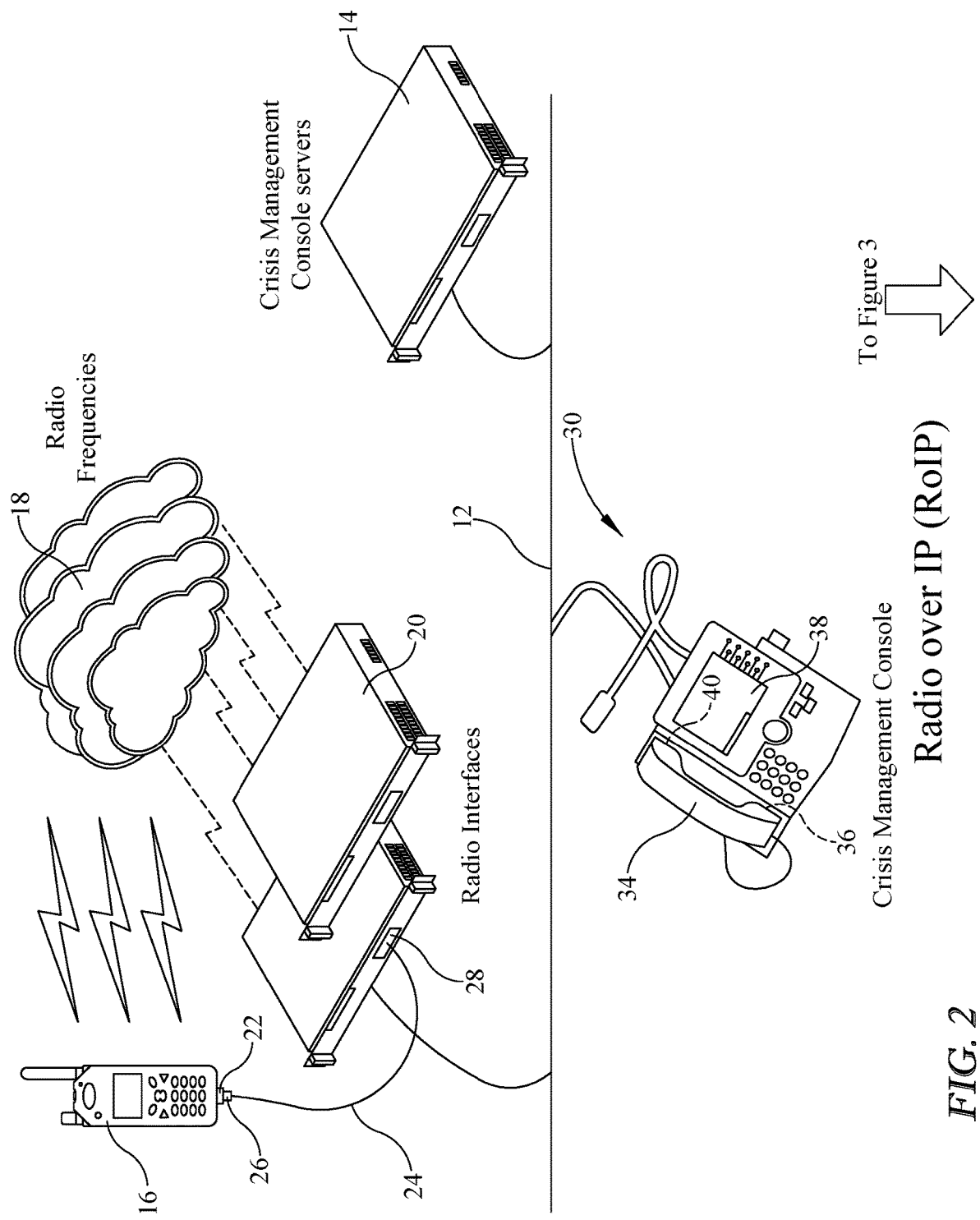
FIGS. 2-5 are schematics illustrating the build out of the integrated VOID and RoIP communication network.

Referring now to the drawings, it is seen that the integrated VoIP and RoIP communication network of the present invention, generally denoted by reference numeral 10, is comprised of an overall network backbone 12 which is under the control of a crisis management configuration server, also called a CMC (Crisis Management Communication) server 14, which may be physical or virtual. Various radios 16 operating on various radio frequencies 18 (i.e., UHF, VHF, SATCOM, FM, FRS, etc.,) from one or more manufacturers are attached to an IP-based media gateway 20 (i.e., gateway router) to thereby connect the radios 16 to the network backbone 12. Attachment of the radios 16 to the media gateway 20 is via the E&M port 22 of the radio (e.g., radio interface) using a cable 24 with a radio connector 26 on one end that matches the particular radio manufacturer's propriety analog audio specification for microphone and speaker functionality that is plugged into the radio 16. The other end 28 of the cable 24 maps that analog audio communication to a standardized E&M type 1-5 RJ45 configuration. The E&M RJ45 is inserted into an IWF (InterWorking Function) standardized E&M port. This cable connection extends the analog radio communication from the radio's audio connector on the radio 16 to the IWF where it is converted into an Internet Protocol (IP). This is repeated for each and every radio 16 that is connected to the IWF. The Internet Protocol configuration within the IWF's E&M port conditions the radio's analog signal for clarity (i.e. gain, volume, attenuation, echo, etc.), as well as tags it so it can be transported on the Internet using Internet Protocol. Each radio's communication traffic is tagged with a unique, numeric set of digits in order to tag the radio communication, as well as identify the radio 16 by a unique, routable IP address so that others on the integrated VoIP and RoIP communication network 10 can communicatively contact the radio 16 via these tags. The IWF is attached to an IP-based network so that the IWF can transmit IP packets (the radio traffic) to the CMC server 14. An IP-based voice communication protocol (e.g., Session Initiated Protocol [SIP], H.323, etc.) is used to connect and transmit the radio signals (communication traffic) between the IWF and the CMC. An EUD 30 (End User Device) or CMC EUD, for example a Turret, is the instrument of the CMC EUD that is used to allow voice, radio, video and data communication, interaction and collaboration. The CMC EUD 30 is attached to the IP-based network backbone 12 for communication to and with the CMC, IWF and other communication mechanisms. The CMC EUD 30 is a purpose-built tool with the capability to bridge, integrate, and/or combine one or multiple communication streams/traffic (i.e., radio, analog, IP). At a minimum, the CMC EUD 30, has at least one IP network port 32 for IPv4/IPv6 connectivity, a handset 34, a microphone 36, a presentation display 38 and/or a speaker 40 to make it a multi-faceted, ad-hoc conference capable, independent communication instrument. This creates the RoIP portion of the integrated VoIP and RoIP communication network 10, see especially FIG. 2

Figure 3:
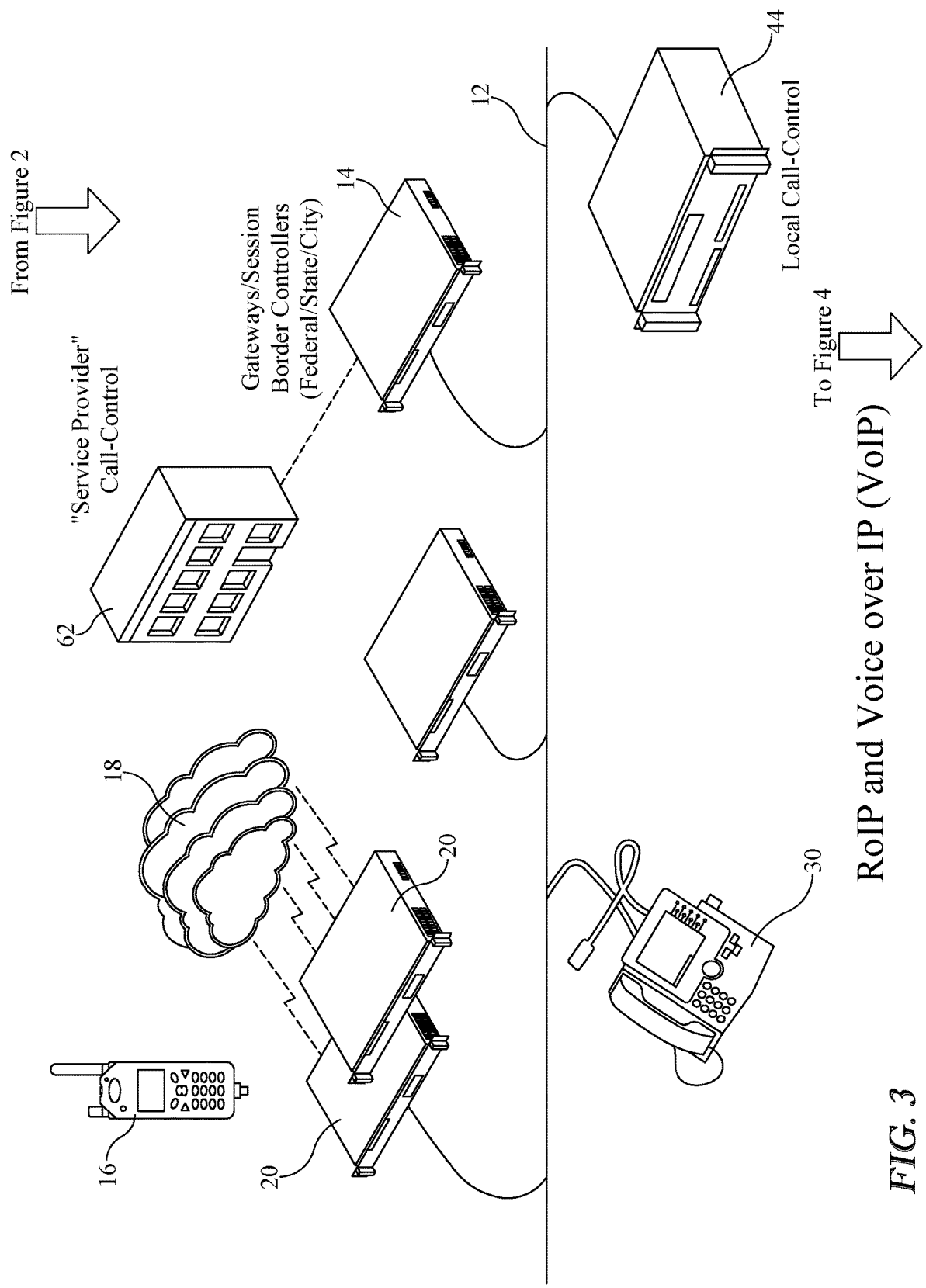

With the initial RoIP foundation of the architecture established, other communication mechanisms, such as Local Call-Control, are added as part of the CMC architecture. These other communication mechanisms themselves have configurable devices, such as IP Gateway/Session Border Controllers 42, associated therewith in order to extend and protect each communication mechanism's communication reach. The Local Call-Control 44 itself also has telephones 46 (IP and/or analog) registered with it that establishes its on premise and/or off-premise voice and/or video communication network. The CMC EUD 30 is configured in the CMC server 14 to connect to the Local Call-Control 44 so voice communication is achieved to the Public Switched Telephone Network (PSTN) and/or cellular-based network through the Local Call-Control 44, if not attached separately. This IP-based connection allows the CMC server 14 and the CMC EUD 30 to have multiple, simultaneous communication pathways (e.g., radio, IP, PSTN, cellular). The CMC server 14 is the "cornerstone" through an IP connection to the network architecture to guide, template, profile, control and administratively manage all components that it registers with through IP techniques (i.e., SIP, H.323, High-Speed Wireless, etc.,) with the CMC EUD 30. The CMC EUD 30 is a "client" that not only registers with the CMC server 14 for profile and template management and administrative control, but also with the Local Call-Control for routing voice and video communication to the PSTN/cellular network, if not configured separately. See especially FIG. 3.

Figure 4:
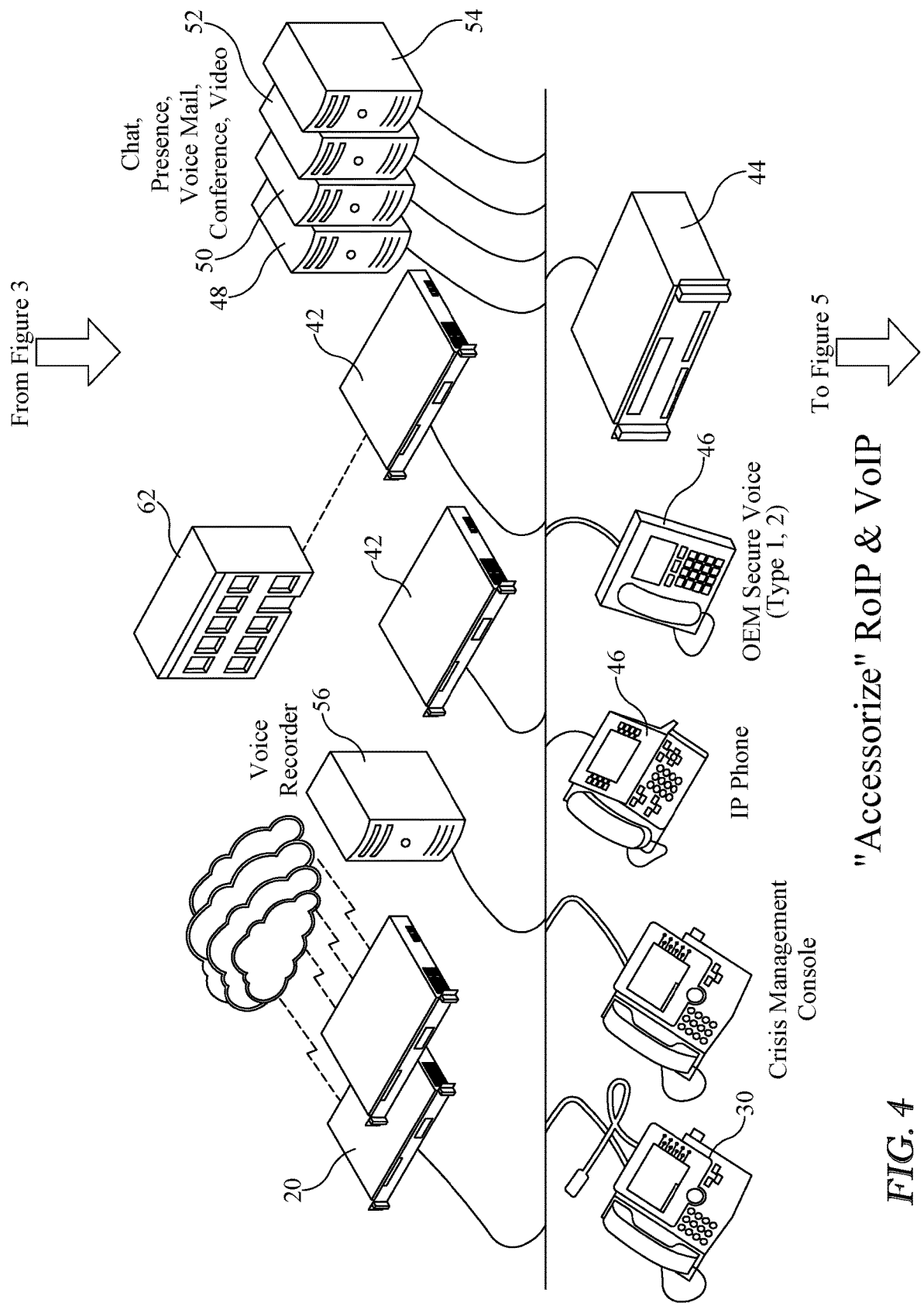

Now that the CMC architecture foundation for "radio" and "voice" communication is extended, the integrated VoIP and RoIP communication network is accessorized in order to enhance, strengthen and support the CMC capability (e.g., Chat 48, Presence 50, Voice Mail 52, Conference Scheduling 54, Video 56, Voice Recorder 58). These components register with the CMC server 14 as needed to add functionality and capability to assist in meeting government and commercial requirements (i.e., DoD Unified Capability Requirements [UCR], Local and State Legislative requirements [e911], etc.,). See especially FIG. 4.

Figure 5:
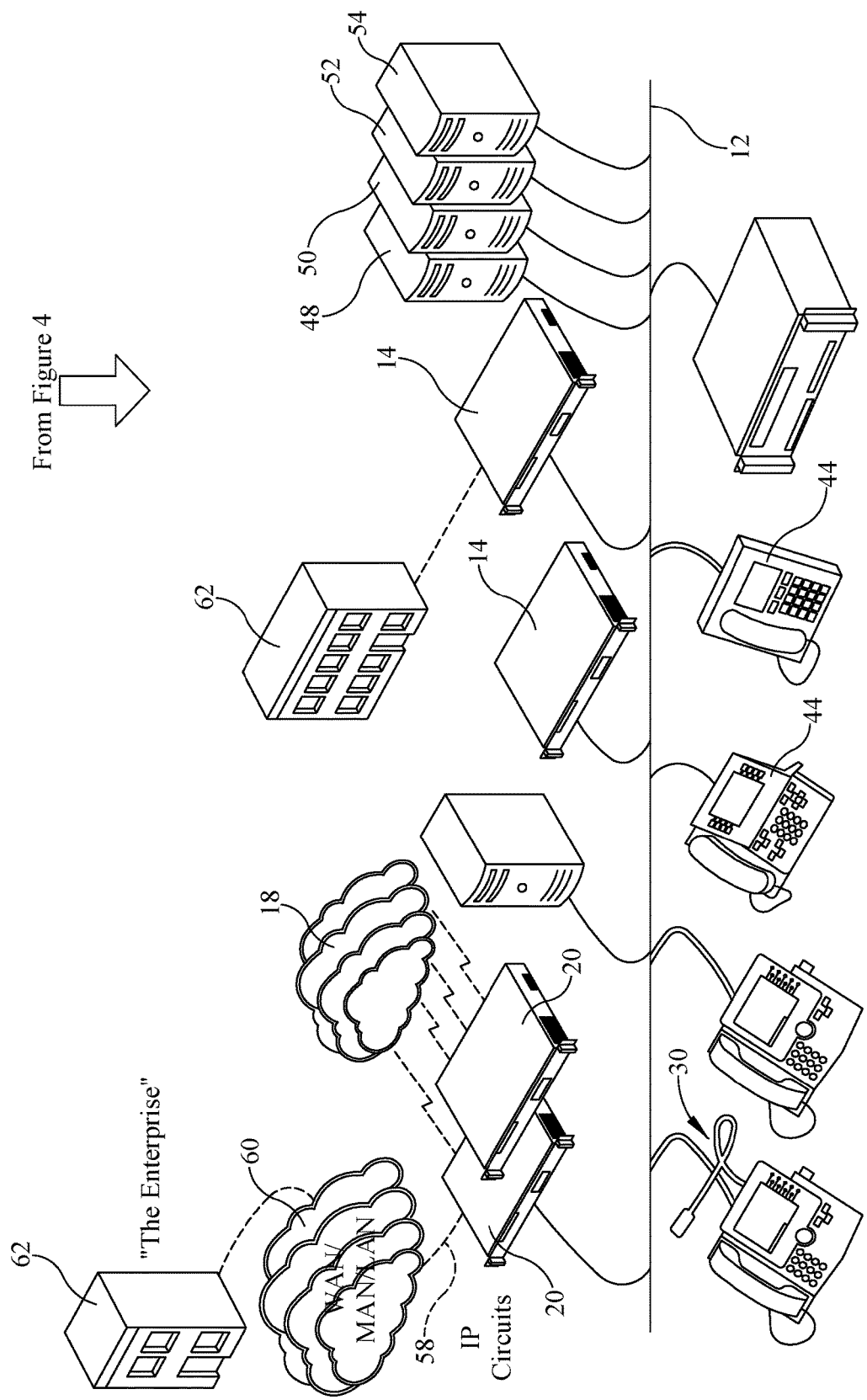

With the CMC architecture extended and strengthened with communication adjuncts locally (on premise and/or off-premise), the architecture (e.g., IP circuits 60) can be expanded to diversify and increase redundancy and survivability by adding pathway connections to other CMC architectures 62 by Local Area Networks (LAN), Metropolitan Area Networks (MAN) and/or Wide Area Networks (WAN) 64 depending on the needs for which the system is deployed. This creates a large, global enterprise CMC architectural solution. In this enterprise model, radios 16 that are connected with an IWF in a different geographic area, are reachable and accessible by any CMC and CMC EUD 30 in any location, see especially FIG. 5.

While the invention has been particularly shown and described with reference to an embodiment thereof, it will be appreciated by those skilled in the art that various changes in form and detail may be made without departing from the spirit and scope of the invention.

I claim:

1. An integrated VoIP and RoIP communication system comprising:
    an Internet Protocol based network backbone under the control of a server;
    a first two-way communication device that communicates over a first radio frequency communicatively connected to the network backbone, the first communication device having a first radio E&M port, the first two-way communication device being tagged with a first unique addressable IP address by the server;
    a second two-way communication device that communicates over a second radio frequency that is different relative to the first radio frequency, the second two-way radio communication device communicatively connected to the network backbone, the second communication device having a second radio E&M port, the second two-way communication device being tagged with a second unique addressable IP address by the server;
    a third two-way communication device that communicates over a telephone network communicatively coupled to the network back bone such that the first communication device and the second communication device communicate with one another, the third two-way communication device being tagged with a third unique addressable IP address; by the server; and
    an End User Device operatively connected to the network backbone so that the first two-way communication device communicates directly and exclusively with the second two-way communication device across the network backbone, the first two-way communication device communicatively contacting the second communication device via the second IP address and the second two-way communication device communicatively contacting the first communication device via the first IP address and the first two-way communication device communicates directly and exclusively with the third two-way communication device across the network backbone, the third two-way communication device communicatively contacting the first communication device via the first IP address, and the second two-way communication device communicates directly and exclusively with the third two-way communication device across the network backbone, the third two-way communication device communicatively contacting the second communication device via the second IP address such that all communication between the first two-way communication device, the second two-way communication device and the third two-way communication device is under the control of the End User device.

2. The integrated VoIP and RoIP communication system communication system as in claim 1 further comprising:
    a RoIP (Radio over Internet Protocol) gateway having an InterWorking Function and an InterWorking Function E&M port;
    a first cable having a first end connected to the first radio E&M port and a second end connected to the InterWorking Function E&M port of the RoIP gateway to thereby communicatively connect the first communication device to the network backbone; and
    a second cable having a third end connected to the second radio E&M port and a fourth end connected to the InterWorking Function E&M port of the RoIP gateway to thereby communicatively connect the first communication device to the network backbone.

3. The integrated VoIP and RoIP communication system as in claim 1 wherein the third communication device is a telephone.

4. The integrated VoIP and RoIP communication system as in claim 3 wherein the first communication device and the second communication device each communicate over a Public Switch Telephone Network.

5. The integrated VoIP and RoIP communication system as in claim 3 wherein the first communication device and the second communication device each communicate over a cellular telephone network.

6. The integrated VoIP and RoIP communication system as in claim 1 wherein the network backbone has a chat presence subsystem usable by the first communication device, the second communication device, and the third communication device, the chat presence subsystem under the control of the End User Device.

7. The integrated VoIP and RoIP communication system as in claim 1 wherein the network backbone has a voice mail subsystem usable by the first communication device, the second communication device, and the third communication device, under the control of the End User Device.

8. The integrated VoIP and RoIP communication system as in claim 1 wherein the network backbone has a conference scheduling subsystem usable by the first communication device, the second communication device, and the third communication device, under the control of the End User Device.

9. The integrated VoIP and RoIP communication system as in claim 1 wherein the network backbone has a video communication subsystem usable by the first communication device, the second communication device, and the third communication device, under the control of the End User Device server.

10. The integrated VoIP and RoIP communication system as in claim 1 wherein the network backbone has a voice recording subsystem usable by the first communication device, the second communication device, and the third communication device, under the control of the End User Device server.

11. The integrated VoIP and RoIP communication system as in claim 1 wherein the network backbone has a voice communication subsystem usable by the third communication device under the control of the End User Device.

* * * * *